April 28, 1970 R. EDMONDSON 3,508,430
FORGING MACHINE WITH HYDROSTATIC BEARINGS
Filed Feb. 13, 1968 5 Sheets-Sheet 3

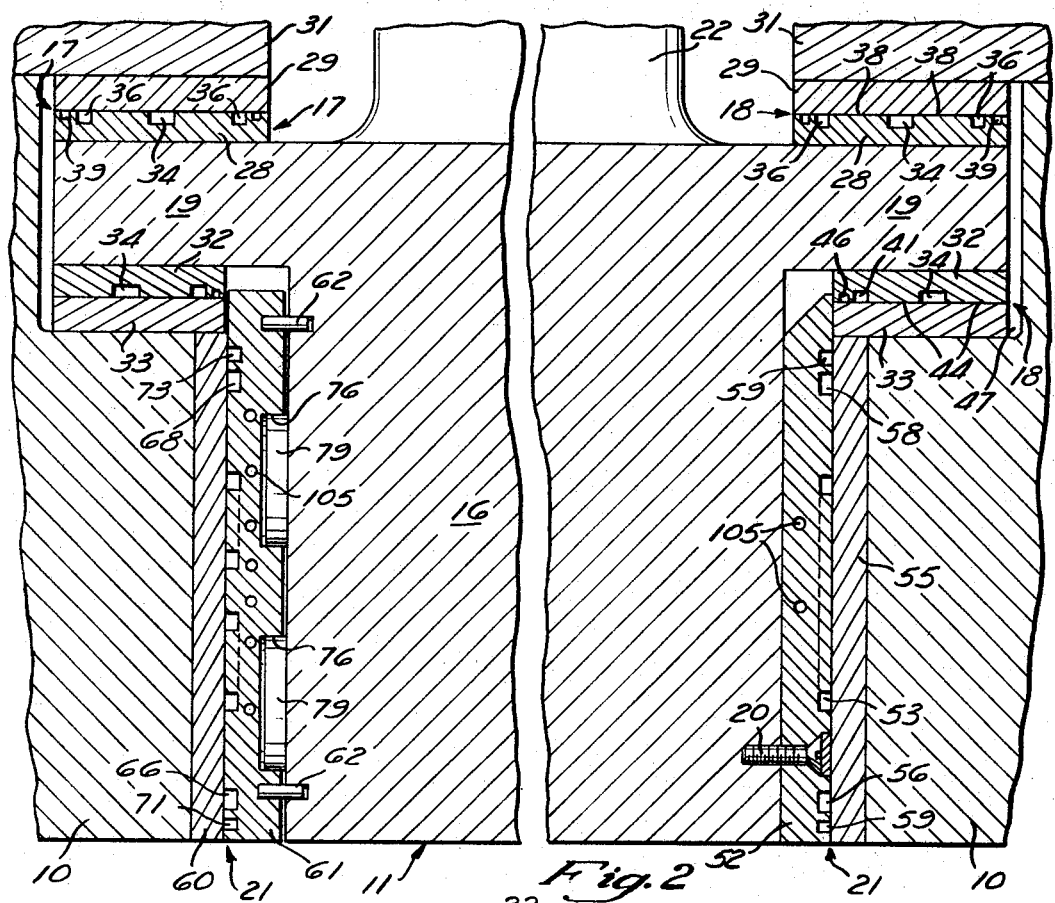
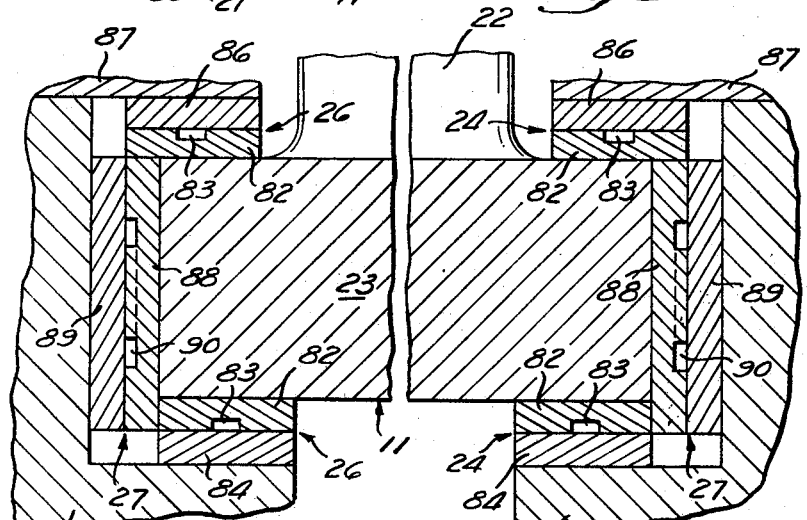

INVENTOR
RICHARD EDMONDSON
BY
McNENNY, FARRINGTON, PEARNE & GORDON
ATTORNEYS

April 28, 1970  R. EDMONDSON  3,508,430
FORGING MACHINE WITH HYDROSTATIC BEARINGS
Filed Feb. 13, 1968  5 Sheets-Sheet 4

INVENTOR
RICHARD EDMONDSON
BY
MCNENNY, FARRINGTON, PEARNE, & GORDON
ATTORNEYS

INVENTOR
RICHARD EDMONDSON
BY
McNENNY, FARRINGTON, PEARNE, & GORDON
ATTORNEYS

United States Patent Office 3,508,430
Patented Apr. 28, 1970

3,508,430
FORGING MACHINE WITH HYDROSTATIC BEARINGS
Richard Edmondson, Tiffin, Ohio, assignor to The National Machinery Company, Tiffin, Ohio, a corporation of Ohio
Filed Feb. 13, 1968, Ser. No. 705,110
Int. Cl. B21j 13/04
U.S. Cl. 72—456                                19 Claims

ABSTRACT OF THE DISCLOSURE

A forging machine including a slide reciprocably mounted in a frame with hydrostatic bearings at each end of the slide. The hydrostatic bearings at the head end of the slide are provided with return grooves arranged to deliver the bearing lubricant to the rearward end of the machine which is the sump for the bearing lubricant. Vacuum grooves are located in the bearings around the return grooves to collect any liquid which passes the return grooves so that such liquid does not escape into the forward end of the machine and mix with the tool lubricant. A hydraulic compensator is provided to automatically compensate for thermal expansion of the machine elements or changes in dimensions which occur due to stressing. The hydrostatic bearings are arranged in opposed pairs so that the bearings work against each other and provide a system in which the bearings are effectively preloaded to improve accurracy of slide positioning.

BACKGROUND OF INVENTION

This invention relates generally to forging machines or the like and more particularly to a novel and improved forging machine or the like having a reciprocating slide supported by hydrostatic bearings.

Various types of forging machines provide a reciprocating slide which carries tools toward and away from cooperating dies mounted on the machine frame. Such machines may be of a variety of types such as horizontal or vertical, single or multi-station, and single or multi-blow. In such machines a heavy slide is reciprocably driven by any suitable means and is usually journaled on planar or flat side bearings. The accuracy of the machine is determined to a great extent by the accuracy of the bearings in positioning the slide.

Typical slide bearings require some operating clearance so in machines employing typical slide bearings, the slide is free to move laterally an amount at least equal to the running clearance of the bearings. Generally in the past such clearance has been acceptable since there is a tendency for a slide to operate against one side or the other. However, where extreme accuracy is required, such clearance in the support bearings produces problems.

In order to provide improved accuracy some machines have employed preloaded roller bearings of the type illustrated in the United States Letters Patent 2,918,333. Because these bearings are preloaded, all clearances are eliminated and improved accuracy of slide positioning is achieved. However, such bearings are generally useful only on lighter machines since the load capacity of such bearings is somewhat limited.

An additional difficulty is sometimes encountered with typical slide bearings in that a slide may freeze or hang up after the machine has been stopped since the lubricating film between the slide bearing surfaces is normally maintained only while movement is occurring therebetween. Consequently the break-away friction required to start the slide in motion is sometimes quite large and produces difficulty in initiating the operation of the machine.

SUMMARY OF THE INVENTION

In the illustrated machine incorporating this invention opposed pairs of hydrostatic bearings are employed to support the slide for reciprocating movement in the frame. In such bearings, break-away friction is negligible since a lubricating film is produced by the pump prior to the start of slide movement. Also in such bearings extreme accuracy is obtained in the location of the slide since the opposing bearings work in opposition to each other and function to precisely position the slide. In effect such bearings are preloaded. Further, in the illustrated embodiment of this invention, hydraulic means are provided to compensate for expansion of the machine elements produced by heating during operation and also to compensate for deformation of the machine elements due to loading of the various structural members. Still further in a machine incorporating this invention means are provided to minimize the loss of the liquid used in the hydrostatic bearings and to prevent the mixing of hydrostatic bearing lubricant with the coolant or cutting liquids used elsewhere in the machine.

OBJECTS OF INVENTION

It is an important object of this invention to provide a novel and improved forging machine or the like utilizing hydrostatic bearings or the like to support a reciprocating slide and precisely position the slide with respect to the frame of the machine.

It is another important object of this invention to provide a novel and improved machine according to the preceding object wherein hydraulic means are provided to maintain the proper running clearance of the bearings even when various machine elements change in size, either due to heating or stressing.

It is still another object of this invention to provide a novel and improved machine according to either of the preceding objects wherein special means are provided to minimize the loss of the hydrostatic fluid used in the hydrostatic bearings.

Further objects and advantages will appear in the following description and drawings wherein:

FIGURE 2 is a fragmentary cross section taken generally along 2—2 of FIGURE 1 illustrating the structure of the bearings at the head end of the machine;

FIGURE 3 is a fragmentary cross section taken generally along 3—3 of FIGURE 1 illustrating the bearing structure at the tail end of the machine;

Figure 1:
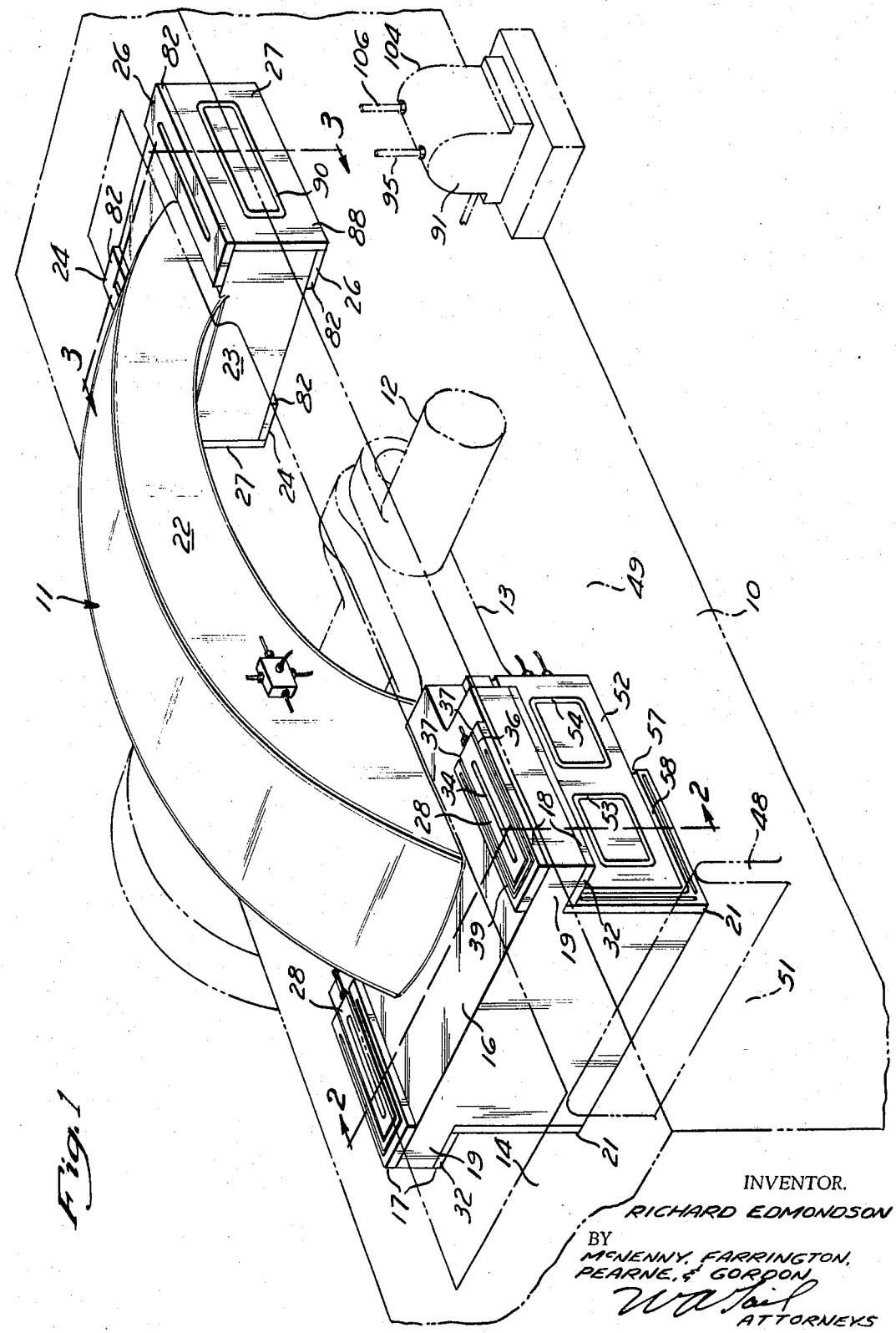
FIGURE 1 is a perspective view of a forging machine incorporating this invention with the slide shown in full line and the frame and drive shown in phanton.

FIGURE 1 schematically illustrates a typical multi-station forging machine having a slide journaled on bearings in accordance with this invention. In this figure only the slide is illustrated in ful line with the frame and drive for the machine illustrated in phantom. It should be recognized that such a machine would normally include all of the typical accessories such as stock feed mechanisms, shear mechanisms, transfer mechanisms, and tools and dies. However, to simplify the understanding of this invention, such accessories are not illustrated.

The machine includes a frame 10 which is generally rectangular in shape and which provides a central cavity in which a slide 11 reciprocates. Journaled on the frame is a crank shaft 12 which is powered by any suitable motor means and which is connected through a pitman 13 to reciprocate the slide 11. In a typical machine a die breast is mounted at the head end 14 of the frame and is provided with dies which cooperate with tools mounted on the head end 16 of the slide to form stock into a desired shape. Since the particular arrangement of the tools and dies form no part of this invention, they have not been illustrated.

Referring to FIGURES 1 and 2, the head end 16 of the slide 11 is provided with a head end bearing assembly consisting of three pairs of opposed hydrostatic bearings. In FIGURE 1 only the bearing runners are illustrated. Vertical support for the head end of the slide 11 is provided by two pairs of opposed bearings 17 and 18 which are mounted on the upper and lower faces of wings 19 which project from opposite sides of the slide. Lateral support for the head end of the slide 11 is provided by the third pair of opposed bearings 21 which are mounted on opposite lateral sides of the head end 16.

The slide 11 is provided with a bridging portion 22 which extends upwardly and over the crank 12 and pitman 13 from the head end 16 to the tail end 23 of the slide. The support for the tail end 23 is provided by a second hydrostatic bearing assembly, best illustrated in FIGURE 3, which again includes three pairs of opposed hydrostatic bearings. Here again only the bearing runners are illustrated in FIGURE 1. Vertical support of the tail end 23 is provided by first and second pairs of opposed bearings 24 and 26, respectively, which are mounted on the upper and lower surfaces of the tail end 23 on opposite sides of the connection with the bridging portion 22. Lateral support is provided by the third pair of bearings 27 which are mounted on opposite side faces of the tail end. With this bearing arrangement, including hydrostatic bearings at both the head and tail end of the slide 11, accurate positioning of the slide is achieved during its reciprocating movement in the frame 10.

FIGURE 2 illustrates the structural arrangement of the bearing assembly at the head end 16 of the slide 11. The elements of the bearing pairs 17 and 18 are similar but opposite so only the elements of the bearing pair 18 will be discussed in detail with the understanding that the description is also applicable to the bearing pair 17. The upper bearing of the pair of bearings 18 includes a runner 28 mounted on the upper surface of the wing 19 and a bearing pad 29 mounted on a frame cap 31 removably secured to the main frame 10 to permit removal of the slide 11. The lower bearing of the pair 18 includes a bearing runner 32 mounted on the underside of the wing 19 and a bearing pad 33 mounted on the main frame 10. The bearing pads and bearing runners may be secured to the associated surfaces of the frame or slide in any suitable manner, but I prefer to bolt the bearing parts in position. A representative bolting arrangement is illustrated at the right side bearing in FIGURE 2. A bolt 20 is countersunk, leaded over, and finished so that a continuous bearing surface is provided even over the area of the heads of the bolts.

Referring again to FIGURES 1 and 2, each of the bearing runners 28 and 32 are provided with an axial recess 34 open to the face of the adjacent pad 29 and 33, respectively. Liquid under pressure is applied to the recesses 34 by a pump system illustrated in FIGURE 7 and discussed in detail below. The bearing runners 28 are also formed with a U-shape return groove 36 which is open at the rearward ends 37 of both legs. The sill 38 is located between the recess 34 and the groove 36. The runners 28 are also provided with a U-shaped vacuum groove 39 extending around the return groove 36. The ends of the vacuum groove 39 are closed and the groove is connected to a vacuum pump in the manner discussed below.

Figure 7:
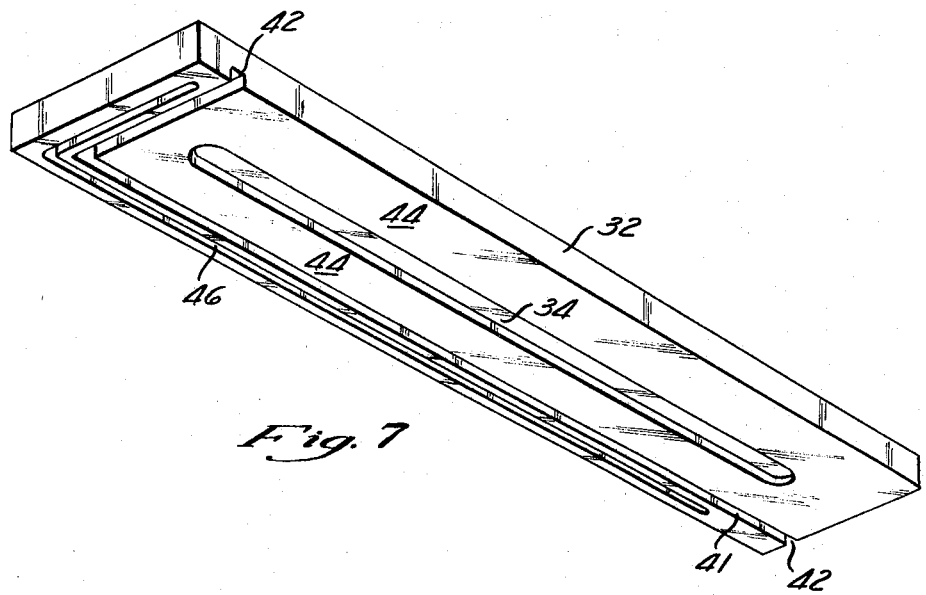
FIGURE 7 is a perspective view of the one of the bearing runners positioned below the wings at the head end of the slide; and, FIGURE 8 is a schematic illustration of the hydraulic circuit for the hydrostatic bearings of the machine.

Referring to FIGURES 2 and 7, the lower bearing runners 32 are formed with an L-shaped return groove 41 which is open at both ends 42. The sill 44 of the lower bearing runner 32 is located between the recess 34 and the return groove 41 on two sides, and between the recess 34 and the rearward and outer edges of the runner on the other two sides. The runner 32 is also formed with an L-shaped vacuum groove 46 around the return groove 41 which is again closed at its ends and connected to a vacuum pump.

When liquid under pressure is applied to the opposed recesses 34, liquid flows across the sills 38 and 44 to the return grooves 36 and 41, respectively. It is recognized that in the upper bearing runner 38 the return groove 36 does not extend across the back of the bearing so some of the liquid will flow off the back end of the runner. Similarly in the case of the runner 32 some of the liquid will flow out along the outer edge into a longitudinal channel 47 formed by the frame 11 and the pad 33. The forward end of the channel 47 is blocked so that liquid flowing into the channel must flow backwardly therealong toward the rear of the machine. Any liquid tending to pass the return grooves 36 and 41 is collected by the vacuum in the vacuum grooves 39 and 46 so that essentially no lubricant reaches the forward end of the machine. The use of the vacuum groove further reduces any tendency for the lubricant to form a wedge as the runners move back and forth. The lubricant flowing out of the bearings flows to the rearward end thereof at a location behind a vertical wall 48 (illustrated in FIGURE 1) which divides the frame into a rearward portion 49 which serves as a sump for the bearing lubricant. The wall 48 separates the sump 49 from the forward or head end of the frame 51 which serves as a sump for the tool coolant. The various elements are proportioned so that the rearward ends of the return grooves are rearward of the wall 48 in all positions of the slide so that pollution or mixing of the bearing lubricant and the tool coolant is not significant.

Figure 5:
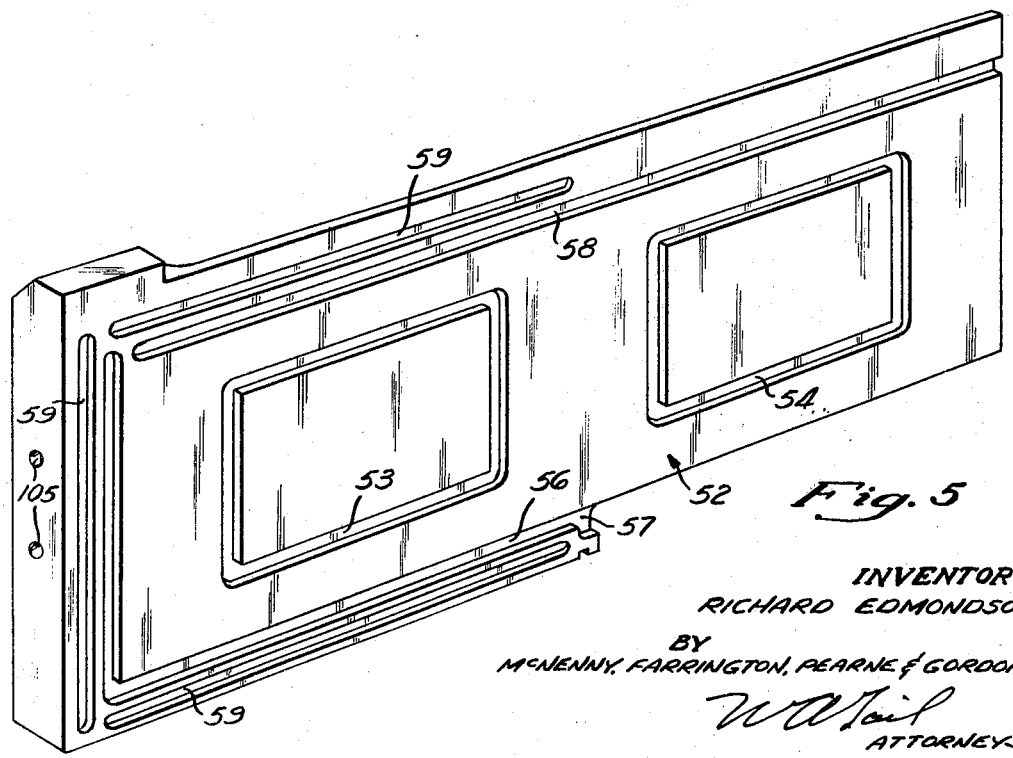
FIGURE 5 is a perspective view of the lateral bearing runner at the right side of the head end of the machine.

The lateral support of the head end 16 of the slide is provided by the opposed pair of bearings 21. The bearing on one side provides a runner 52 securely fastened to a side wall of the slide adjacent to a pad 55 secured to a side wall of the frame 10. As best illustrated in FIGURES 1 and 5, the runner 52 is formed with two similar rectangular grooves 53 and 54 which define two separate recesses in the bearing. The central portions within the grooves 53 and 54 may be recessed if desired. However, since the grooves totally enclose these portions, recessing of the surface is not required and the effective area of the recesses is the area enclosed within the outer edges of each of the grooves 53 and 54.

The runner 52 is formed with a first L-shaped return groove 56 which extends downwardly adjacent to the forward end of the runner and along the bottom thereof to an opened end 57. A longitudinal return groove 58 extends above the recesses 53 and 54 to the rearward end of the runner 52 and is open at the rearward end thereof. The end 57 of the return groove 56 is located so that it is rearward of the wall 48 in all positions of the slide so that liquid collected therein drops down into the rearward portion 49 of the frame.

Positioned around the return grooves 56 and 58 are three vacuum grooves 59 cooperating to form a U-shaped assembly. These grooves may be continuous throughout their length or formed of separate legs as desired. The ends of the vacuum grooves 59 are closed and the grooves are connected to a vacuum pump. The vacuum grooves 59 need not extend all the way to the rearward end of the runner so long as the longitudinal legs extend to a position which is rearward of the wall 48 in all positions of the slide. The two separate recesses 53 and 54 improve the longitudinal stability of the bearing since it is relatively large and would be subjected to a considerable amount of wedge effect if a single recess were used.

Figure 4:
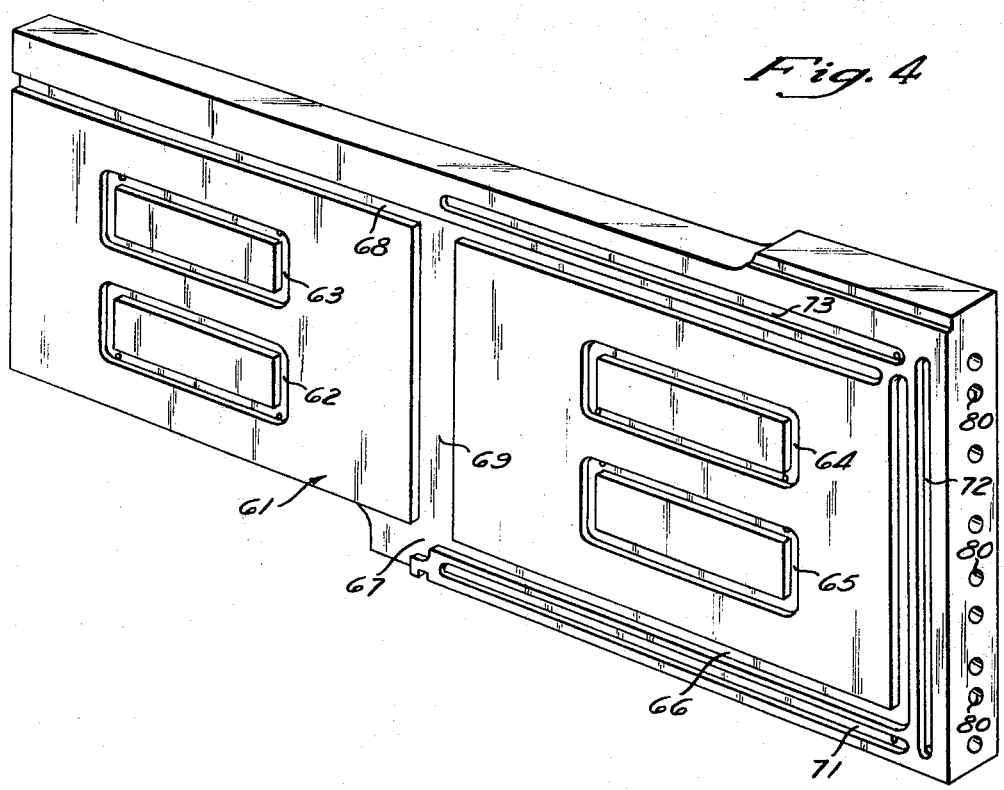
FIGURE 4 is an enlarged perspective view of the lateral bearing runner at the left side of the head end of the machine.
Figure 6:
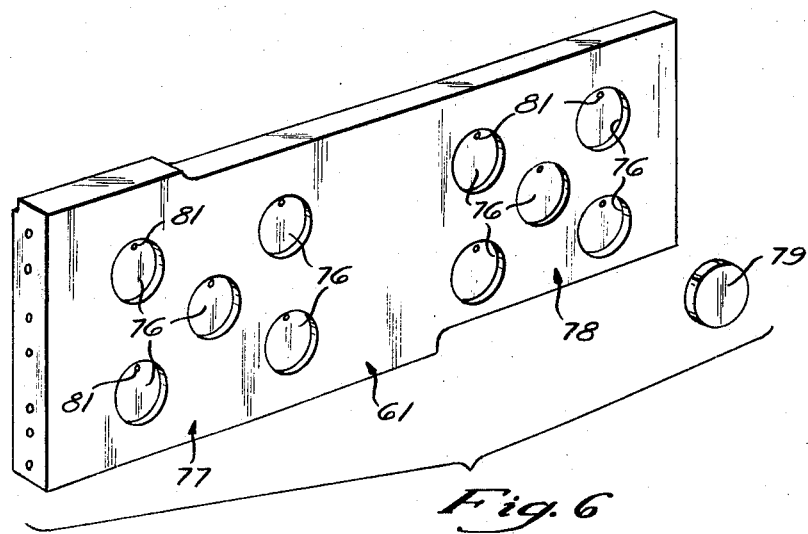
FIGURE 6 is a back view of the bearing runner illustrated in FIGURE 4.

Referring to FIGURES 2, 4, and 6, the opposite lateral bearing is provided with automatic hydraulic means to compensate for deflections in the frame 10 and slide 11 and also to compensate for expansion due to heating, or the like. This bearing includes a runner 61 positioned against the slide 11 and retained in position by dowel pins 62. The runner 61 is formed with four rectangular grooves 62, 63, 64, and 65 which are symmetrically positioned on the bearing face thereof. An L-shaped return groove 66 extends upwardly along the forward end of the runner and is open at its rearward end 67 at a location which is always to the rear of the wall 48. An additional return groove 68 extends lengthwise of the runner adjacent to the top thereof. In this runner a vertical groove 69 provides a positive separation between the forward and rearward recesses so that the sills between the pairs of recesses are positively separated. Three vacuum grooves 71, 72, and 73 are positioned in a U-shape around the return groove and are closed at their ends. They cooperate to form a U-shaped vacuum groove assembly which is connected to a vacuum pump. The rearward end of the longitudinal legs 71 and 73 extends to a location rearwardly of the wall 48 in all positions of the slide.

Referring to FIGURE 6, the rearward face of the runner 61 is provided with ten counterbores 76 which serve as cylinder bores for ten separate fluid motors. The bores 76 are arranged in two groups of five bores 77 and 78. The two groups 77 and 78 are symmetrical with respect to the forward and rearward recesses 62 through 65. Positioned in each of the counterbores 76 is a flat piston 79. Seals (not illustrated) are provided to prevent leakage past the pistons 79. The pistons 79 bear against the side wall of the slide and when liquid under pressure is admitted behind the pistons 79, a force which is a function of the pressure supplied, is produced urging the runner 61 toward the pad 60. The counterbores are arranged symmetrically with respect to the recesses formed by the grooves 62 through 65, so that the force on the bearing is equally distributed along the surface and a substantially uniform film thickness is produced.

When the frame 10 deflects or deforms either due to thermal heating or stresses, the fluid under pressure in the counterbores 76 serves to produce a reaction force pressing the runner 61 toward its associated pad to maintain proper preload on the system. The openings 81 into the counterbores from longitudinal connecting passages 80 are are preferably formed relatively small so that they provide a restricted flow connection. This restriction serves to hydraulically lock the fluid motors against rapid movement in response to impulse loading which tends to occur when the tools actually engage the workpieces being forged. However, it does not affect the ability of the fluid motors to compensate for steady state conditions of expansion or deflection.

Because the tail end 23 of the slide 11 is always in the area over the rearward portion 49 of the frame, it is not necessary to provide return grooves or vacuum grooves to collect the bearing lubricant. Referring to FIGURES 1 and 3, the bearing pairs 24 and 26 are similar, but opposite, and each provides runners 82 having longitudinal recesses 83 which are connected to the pump and are supplied with liquid under pressure. Lower pads 84 are bolted to the frame 10 directly and upper pads 86 are secured to removable frame plates 87. The lateral bearing pair 27 includes similar, but opposite, runners 88 on the slide and pads 89 on the frame. The runners 88 are provided with rectangular grooves 90. The bearing lubricant for the rearward bearings merely passes across the sills of the respective bearings and drops down into the rearward portion 49 which serves as a sump for the bearing lubricant.

Figure 8:
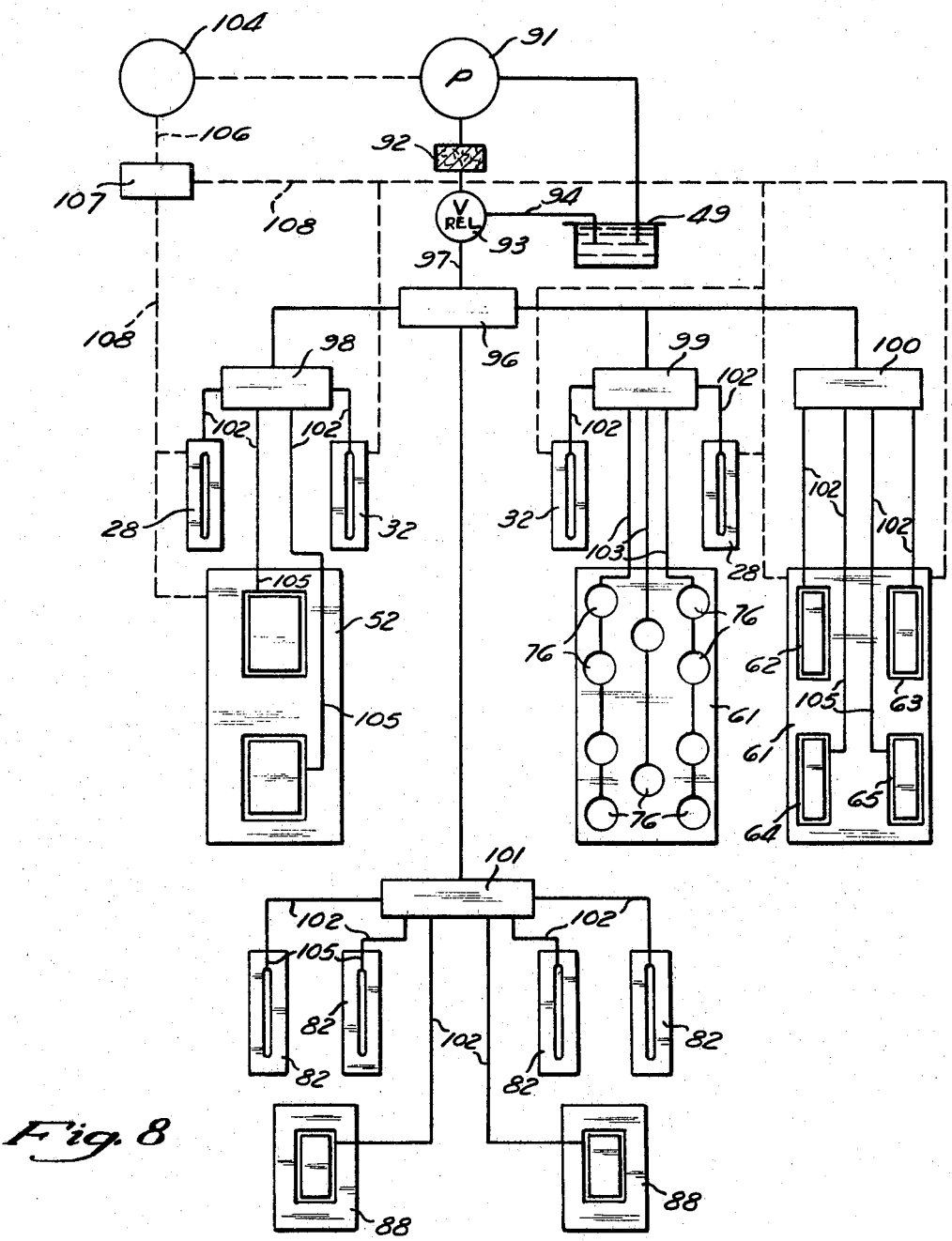

FIGURE 8 is a schematic illustration of the hydraulic and vacuum circuits of the bearing system. A pump 91 is provided with an inlet connected to the sump formed by the rearward portion 49. The high pressure outlet 95 of the pump is connected through a filter 92 to a regulating relief valve 93 which functions to maintain a predetermined supply pressure. In the illustrated embodiment this pressure is about 250 p.s.i. The relief valve returns excess liquid through a return line 94 to the sump 49. The pump 91, filter 92, and relief valve 93 are preferably mounted on the frame 10 of the machine and are connected to a distributor 96 on the slide 11 by flexible pressure line 97. From the distributor 96 the liquid under pressure flows to four manifolds 98 through 101. The manifold 98 is in the supply of the runners 28 and 32 at one side of the slide and the runner 52. A second manifold 99 is in the supply of the runners 28 and 32 on the other side of the slide and also in the supply of the counterbores 76 of the runner 61. A third manifold 100 is in the supply of the recesses 62 through 65 of the runner 61. The fourth manifold 101 is in the supply of the runners 82 and 88 at the tail end of the slide.

The distributor 96 is connected to the manifolds 98, 99, 100, and 101 through relatively large diameter lines so that a relatively low pressure drop occurs between the distributor and the respective manifolds. The recesses of each of the runners 28, 32, 52, 61, 82, and 88 are separately connected to the respective manifolds by capillary tubes 102. Each of the capillary tubes is selected as to size and length so that they provide a desired flow resistance. Each of the runners is formed with a longitudinal bore 105 which connects the associated recess with the associated capillary tube 102. The manifold 99 is connected to the counterbores 76 through relatively large diameter lines 103 so that substantial pressure drops do not occur therein. However, the lines 103 are connected to each of the counterbores 76 through a restricted orifice 81 (illustrated in FIGURE 6) so that each of the counterbores and its associated piston is substantially hydraulically locked against rapid movement.

A vacuum pump 104 is provided with a vacuum port connected through a flexible line 106 to a manifold 107 on the slide 11. Preferably the vacuum pump and the lubricant pump 91 are a single or a combined unit (as illustrated in FIGURE 1) capable of pressurizing the bearing lubricant and producing the vacuum required by the system. The manifold 107 is connected through lines 108 to the vacuum grooves in the runners 28, 32, 52, and 61. Since vacuum is not required by the tail bearings, they are not connected to the manifold 107.

In one embodiment of this invention the pressures of the various portions of the hydraulic system were measured. It was found that the pressure in the manifold 98 was about 242 p.s.i., the pressure in the manifold 99 was about 246 p.s.i., and the pressure in the manifold 100 was about 248 p.s.i. When equilibrium was reached, the pressure in the recess 34 of the runner 32 of the pair of bearings 18 was 116 p.s.i. while the pressure in the associated recess 34 of the runner 28 at the right side as viewed in FIGURE 2 was 94 p.s.i. The corresponding pressure in the recesses 34 on the left pair of bearings 17 was 135 p.s.i. for the lower runner 32 and 113 p.s.i. for the upper runner 28. The running clearance between the opposed bearings is preferably in the order of 5 to 10 thousandths of an inch total clearance.

In operation, the pressure of the fluid in the runners 32 causes the slide to be raised slightly from the pads 33 bringing the upper runners 28 closer to the pads 29. Very slight movement radically changes the flow through the bearing since the effective orifice provided by the bearing across the sill is relatively long. Therefore, very slight movement of a runner toward or away from its associated pad causes radical pressure changes in recesses since the pressure drop through capillaries 102 changes with flow. In practice it has been found that the equilibrium position of the slide shifts only a very small amount even with relatively large changes in the force supported by the bearings. The weight of the slide tends to cause equilibrium to be reached when the lower bearings under the wings 19 are in a higher pressure than the upper bearings. If the downward load on the slide changes in a manner tending to cause the slide to move downward, the effective orifice over the sill of the runners 32 will decrease a substantial amount causing a decrease in flow and an increase in pressure in the recesses 34 of the runners. At the same time the effective orifice over the sill of the runners 28 increases in size so the flow increases causing a greater pressure drop across the associated capillary tubes 102. This causes a drop in the pressure in the recesses 34 in the runners 28. Since the pressures in the opposed runners both change in opposite directions, a very small movement will occur before equilibrium is again reached even under relatively large changes in loading. Consequently, the bearings function to precisely position the slide with respect to the frame.

A similar action occurs with the lateral bearings. However, automatic compensation for deformation of the frame is achieved through the use of the hydraulic motor means provided by the counterbores 76 and associated pistons 79. When the system is pressurized, the force is exerted on the frame tending to spread the sides. This could produce inaccuracy of slide position or loss of effectiveness of the bearings if it were not for the follow-up provided by the hydraulic motors. The hydraulic motors maintain the runner 61 closes to its pad 61 and maintain the desired small clearance in the lateral bearings. Since the orifice 81 serves to resist rapid movement of the piston 71, impulse loading occurring during a forging operation does not produce material lateral movement of the slide.

In the particular machine described above, the pressure in the two recesses 53 anad 54 stabilized at 92 p.s.i. and 122 p.s.i. while the pressures in the four recesses 62 through 65 vary between 127 p.s.i. and 132 p.s.i. The small difference between the pressures in the recesses 62 through 65 establishes the effectiveness of the actuators in maintaining a uniform film thickness between a runner 61 and the pad 60.

The provision of the hydraulic follow-up to compensate for distortion of the frame for the lateral bearings is desirable because relatively large lateral forces are often encountered and because the spacing between the opposed lateral surfaces of the frame is relatively great. Since the bearings which resist vertical movement are closely spaced the thermal effect is not particularly large and automatic compensation for thermal expansions not required. Further, the stiffness of the frame across such a short span is greater than the stiffness between the widely spaced sides.

Compensation for heating at the tail end of the slide is not required nor is compensation for distortion of the frame. First the heating occurring at the tail end is not as great as that occurring at the head end and the vertical and lateral forces at the tail end of the slide are relatively small when compared to the forces at the head end.

It has been found in actual tests that a higher degree of accuracy of forging can be achieved with slide supported by bearings in accordance with this invention that can be achieved with standard slide bearings. The opposed bearings function as preloaded bearings so free play in the bearings is not present. Further, break away forces are substantially eliminated since the bearing film is obtained by the pressure source before the slide begins to move.

Although a preferred embodiment of this invention is illustrated, it is to be understood that various modifications and rearrangements of parts may be resorted to without departing from the scope of the invention disclosed and claimed herein.

What is claimed is:

1. A forging machine comprising a frame assembly, a slide assembly, a plurality of opposed fluid pressure bearings cooperating to support said slide assembly on said frame assembly against lateral movement and to guide said slide assembly for linear reciprocation, each of said bearings including a bearing runner on said slide assembly in a mating bearing pad on said frame assembly, pump means operable to supply fluid under pressure to each bearing runner to maintain a fluid film between each bearing runner and its associated bearing pad, and force means between at least one of said bearings and said assemblies urging the bearing pad and runner thereof toward each other with a minimum predetermined force to maintain a substantially constant film thickness in said one bearing and the bearing opposite said one bearing even when dimensions of said assemblies change.

2. A forging machine as set forth in claim 1 wherein said force means includes expansible chamber motor means supplied with fluid under pressure at substantially constant pressure.

3. A forging machine as set forth in claim 2 wherein the fluid supplied to said motor means is a liquid, and a restricter is provided to limit the rate of flow from said motor means when said motor means is subjected to load impulses whereby said motor means is substantially rigid with respect to force impulses.

4. A forging machine as set forth in claim 3 wherein said pump means supplies liquid under pressure to each of said bearing runners.

5. A forging machine as set forth in claim 1 wherein the bearing runner of said one bearing is provided with a plurality of separate recesses, each of which is separately connected to said pump means, and said force means are arranged with respect to said recesses to maintain a substantially uniform spacing between said bearing runner and bearing pad of said one bearing.

6. A forging machine as set forth in claim 5 wherein said force means includes a plurality of expansible chamber hydraulic motors between said slide assembly and said bearing runner of said one bearing, and said pump means is adapted to supply liquid under pressure to each of said motors.

7. A forging machine as set forth in claim 6 wherein separate flow restricters are provided between said pump means and at least some of said expansible chamber motors.

8. A forging machine as set forth in claim 7 wherein said slide assembly is supported by a spaced bearing assembly at its ends and is driven by a pitman located intermediate its ends, each end bearing assembly including three pairs of opposed hydrostatic bearings with two pairs located on opposite sides of said slide assembly and substantially parallel to a first plane, and the third pair arranged perpendicular to said first plane.

9. A forging machine as set forth in claim 8 wherein said one of said bearings is one of said third pair of bearings at the head end of said slide assembly.

10. A forging machine comprising a frame, a slide reciprocable on said frame, said slide and frame cooperating to provide a head end of said machine where tools and dies for working stock may be mounted and a tail end opposite said head end, a drive connected to said slide intermediate its ends to reciprocate said slide, hydrostatic bearings at said head end of said slide supporting said slide for linear reciprocation in said frame, said hydrostatic bearings including bearing runners and mating bearing pads, hydraulic pump means, said runners each including a recess supplied with liquid under pressure from said pump means, a sill surrounding each recess, a return groove in each runner on the side of said sill opposite said recess adapted to collect liquid passing over said sill, and a vacuum groove around said return groove adapted to be maintained at a vacuum to collect liquid which passes said return groove.

11. A forging machine as set forth in claim 10 wherein said frame is provided with wall means separating said head end of said frame from the rearward portion thereof, said wall means being adapted to separate tool coolant in said head end from bearing lubricant in said rearward portion, said return grooves being open to said rearward portion and isolated from said head end.

12. A forging machine as set forth in claim 11 wherein said slide reciprocates in a horizontal direction, and the ends of said return grooves are open to and located over said rearward portion in all positions of said slide.

13. A forging machine as set forth in claim 12 wherein said pump means removes bearing lubricant from said rearward portion and delivers it under pressure to said hydrostatic bearings.

14. A forging machine as set forth in claim 13 wherein opposite hydrostatic bearings are provided at said head end each of which includes a bearing runner on said slide and a bearing pad on said frame, and hydraulic motor means are provided between at least one bearing runner and said slide urging said one bearing runner toward its associated bearing pad, said pump means supplying liquid under pressure to said hydraulic motor means.

15. A forging machine as set forth in claim 14 wherein said one bearing runner is provided with a plurality of spaced recesses separately connected to said pump means, and said hydraulic motor means is arranged to apply forces to said bearing tending to maintain a uniform spacing between said one bearing runner and its associated bearing pad.

16. A forging machine as set forth in claim 15 wherein separate hydraulic motor means are associated with each recess.

17. A forging machine as set forth in claim 16 wherein flow restricters are provided between said pump means and said hydraulic motor means to limit movement thereof in response to load impulses applied to said one bearing.

18. A forging machine as set forth in claim 17 wherein a separate flow restricter is provided for each hydraulic motor means.

19. A hydrostatic bearing comprising a planar bearing pad, a planar bearing runner, a recess in said bearing runner surrounded by a sill, a pump operable to supply liquid under pressure to said recess, a restricter between said pump and recess, a return groove in said bearing runner along at least a portion of said sill opposite said recess, said return groove being open to said pump means, a vacuum groove in said bearing runner along the side of said return groove opposite said sill, and vacuum means connected to maintain a vacuum in said vacuum groove to collect liquid which passes through said return groove and return such liquid to said pump means.

References Cited
UNITED STATES PATENTS

| | | | |
|---|---|---|---|
| 3,171,144 | 3/1965 | Maistros | 10—76 |
| 3,355,990 | 12/1967 | Thum | 308—5 |
| 3,384,425 | 5/1968 | Brown | 308—5 |
| 3,418,025 | 12/1968 | Hucks | 308—5 |
| 3,447,840 | 6/1969 | Gress | 308—5 |
| 3,442,560 | 5/1969 | De Gast | 308—5 |

FOREIGN PATENTS 197,280 12/1957 Sweden.

CHARLES W. LANHAM, Primary Examiner

G. P. CROSBY, Assistant Examiner

U.S. Cl. X.R.

72—450; 100—214; 184—7; 308—5